United States Patent Office 2,867,663
Patented Jan. 6, 1959

2,867,663

HYDROGENATION PROCESS

Richard Norman Lacey, Hull, England, assignor to The Distillers Company Limited, Edinburgh, Scotland, a British company No Drawing. Application November 12, 1954
Serial No. 468,583

Claims priority, application Great Britain
November 19, 1953

2 Claims. (Cl. 260—593)

The present invention relates to a process for the production of saturated ketones from alpha-beta ethylenically unsaturated ketones.

The hydrogenation of unsaturated ketones, such as mesityl oxide, using conventional hydrogenation catalysts such as those based on copper, is a known process. However, when using an excess of hydrogen the resulting product contains large amounts of the corresponding carbinol which must be recycled to the hydrogenation stage to prevent serious losses in yield, this recycling serving to prevent further formation of carbinol by its effect on the equilibrium between the carbinol and the saturated ketone. By close control of the hydrogen feed it is possible greatly to reduce carbinol formation but only at the expense of achieving incomplete conversion.

An object of the present invention is to provide a process for the hydrogenation of such unsaturated ketones whereby the saturated ketone is obtained as the main product.

According to the present invention the process for the production of a saturated aliphatic ketone comprises hydrogenating with molecular hydrogen an $\alpha$-$\beta$ ethylenically unsaturated ketone in the vapour phase at a temperature in the range of 100°–300° C. in the presence of a supported palladium catalyst.

The hydrogenation may be carried out at atmospheric or superatmospheric pressure. The reaction temperature may vary, as stated above, from about 100° to about 300° C. with a preference for temperatures in the range 150–200° C.

The palladium catalyst is conveniently used in combination with an inert support such as alpha- or gamma-alumina, silica gel, carborundum, charcoal, pumice or kieselguhr. The catalyst should contain at least 0.01% by weight of palladium based on the volume of the space occupied by the catalyst, and preferably about 0.1 to 2.0% palladium. There is little advantage in employing a catalyst containing more than 2% of palladium and economic considerations also favour the use of the lower concentrations.

Typical unsaturated ketones which may be hydrogenated by the process of the present invention are methyl vinyl ketone, $CH_3COCH=CH_2$, ethylidene acetone $$CH_3COCH=CH.CH_3$$

methyl isopropenyl ketone, $CH_3COC(CH_3)=CH_2$, and mesityl oxide, $CH_3CO.CH=C(CH_3)_2$, the corresponding saturated ketones being methyl ethyl ketone, methyl propyl ketone, methyl isopropyl ketone and methyl isobutyl ketone. However, higher unsaturated ketones, such as isobutylidene acetone and hept-2-en-4-one, may also be hydrogenated. It is a particular advantage of the process of the invention that even when using a large excess of hydrogen, high conversions of the unsaturated ketone with substantially no formation of the carbinol may be achieved. A further advantage of the invention is that impure hydrogen containing small amounts of carbon monoxide can be used satisfactorily without any poisoning of the catalyst taking place.

The following examples illustrate how the invention may be carried out in practice.

Example 1

Mesityl oxide was fed at the rate of 50 cc. per hour to a vapouriser, where the ketone was evaporated and mixed with hydrogen (containing 10–500 parts per million of carbon monoxide) fed at 15–16 litres per hour. The combined vapours were passed over 100 cc. of catalyst 1.3% Pd w./v. on ⅛" gamma-alumina cylinders (Baker Platinum Ltd.) at 200° C. The run was allowed to proceed for 700 hours: throughout and at the end of the run conversion was 99% or better. Yields of methyl isobutyl ketone, after the first 24–28 hours when some high-boiler formation was evident, varied between 94 and 97% with 0.2 to 0.8% formation of methyl isobutyl carbinol.

Example 2

Mesityl oxide was fed at 34 grams per hour with hydrogen at 16–17 litres per hour to a furnace at 170° C. containing 100 cc. of a catalyst obtained by soaking 100 cc. of pumice in a solution of palladium nitrate and evaporating giving a total of 0.2 grams Pd/100 cc. catalyst space. In a 60 hour run the average conversion was 86.3% and the yield of methyl isobutyl ketone was 97.5%. The methyl isobutyl carbinol formed was less than 0.1%.

Example 3

Ethylidene acetone was fed at the rate of 100 cc. per hour to a vapouriser where the ketone was evaporated and mixed with hydrogen (containing 10–500 parts per million of carbon monoxide) fed at 28 to 29 litres per hour. The combined vapours were passed over 100 cc. of catalyst 1.3% Pd on gamma-alumina cylinders (Baker Platinum Ltd.) at 160° C. The run was allowed to proceed for 11 hours. Conversion was 98.6% and the yield of methyl propyl ketone 87.7%. The methyl propyl carbinol formed was 0.1%.

Example 4

Methyl isopropenyl ketone, 95% (w./w.), was fed at 87 grams per hour with hydrogen at 30 litres per hour to a furnace at 160° C. containing 100 cc. of catalyst. 1.30% Pd on gamma-alumina cylinders (Baker Platinum Ltd.). The run was allowed to proceed for 5¾ hours. Conversion was 98.5% and the yield of methyl isopropyl ketone was 92.4%. The methyl isopropyl carbinol formed was 0.1%.

I claim:

1. A process for producing a saturated aliphatic ketone which comprises hydrogenating with molecular hydrogen an $\alpha$:$\beta$-ethylenically unsaturated aliphatic ketone selected from the group consisting of ethylidene acetone, methyl isopropenyl ketone and mesityl oxide in the vapour phase at a temperature in the range from 100° to 300° C. substantially at atmospheric pressure and in the presence of a catalyst consisting of palladium supported on a material selected from the group consisting of gamma-alumina and pumice and containing from 0.1 to 2.0% by weight of palladium based on the total volume of the catalyst, whereby the saturated aliphatic ketone corresponding to the $\alpha$:$\beta$-ethylenically unsaturated aliphatic ketone is produced and formation of the corresponding carbinol is suppressed.

2. A process for producing a saturated aliphatic ketone which comprises hydrogenating with molecular hydrogen containing from 10 to 500 parts per million by volume of the catalyst poison carbon monoxide an $\alpha$:$\beta$-ethylenically unsaturated aliphatic ketone selected from the group consisting of ethylidene acetone, methyl isopropenyl ketone and mesityl oxide in the vapour phase at a temperature in the range from 100° to 300° C. substantially at atmospheric pressure and in the presence of a catalyst consisting of palladium supported on a material selected from the group of gamma-alumina and pumice and containing from 0.1 to 2.0% by weight of palladium based on the total volume of the catalyst, whereby the saturated aliphatic ketone corresponding to the α:β-ethylenically unsaturated aliphatic ketone is produced, formation of the corresponding carbinol is suppressed and the hydrogenation is carried out without poisoning the catalyst.

References Cited in the file of this patent

UNITED STATES PATENTS 2,272,122    Lee _____ Feb. 3, 1942

OTHER REFERENCES

Ber. Deut. Chem. (Ipatiew), vol. 45, p. 3220, September 30, 1912.

Groggins: Unit Processes in Organic Synthesis, 4th ed., pp. 490–491 (1952).

Wagner et al.: Synthetic Organic Chemistry, pp. 337–338 (1953).